United States Patent
Florissi et al.

(10) Patent No.: US 10,334,482 B1
(45) Date of Patent: Jun. 25, 2019

(54) SELF ADAPTIVE APPLICATION AND INFORMATION MOVEMENT IN A CLOUD ENVIRONMENT

(75) Inventors: Patricia G. S. Florissi, Briarcliff Manor, NY (US); Sudhir Vijendra, Cambridge, MA (US); Shashidhar Krishnaswamy, White Plains, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 394 days.

(21) Appl. No.: 12/580,799

(22) Filed: Oct. 16, 2009

(51) Int. Cl.
*H04W 28/24* (2009.01)
*G06F 3/06* (2006.01)

(52) U.S. Cl.
CPC .......... *H04W 28/24* (2013.01); *G06F 3/0646* (2013.01); *G06F 3/0647* (2013.01)

(58) Field of Classification Search
USPC ............................... 707/827, E17.1; 370/352
See application file for complete search history.

(56) References Cited

U.S. PATENT DOCUMENTS

| | | | | |
|---|---|---|---|---|
| 7,797,395 | B1 * | 9/2010 | Thakur | G06F 3/0605 370/229 |
| 7,916,716 | B1 * | 3/2011 | Cope et al. | 370/352 |
| 2003/0145017 | A1 * | 7/2003 | Patton | G06F 17/218 |
| 2006/0206507 | A1 * | 9/2006 | Dahbour | 707/100 |
| 2006/0236061 | A1 * | 10/2006 | Koclanes | G06F 3/0605 711/170 |
| 2007/0204266 | A1 * | 8/2007 | Beaty | G06F 9/45558 718/1 |
| 2009/0029692 | A1 * | 1/2009 | Radermacher | H04M 3/42127 455/418 |
| 2009/0300635 | A1 * | 12/2009 | Ferris | G06F 9/5072 718/104 |
| 2010/0138827 | A1 * | 6/2010 | Frank | G06F 9/45558 718/1 |
| 2010/0333089 | A1 * | 12/2010 | Talwar | G06F 11/004 718/1 |
| 2011/0010514 | A1 * | 1/2011 | Benhase et al. | 711/162 |

OTHER PUBLICATIONS

Pitoura et al., "DBGlobe: A Service-Oriented P2P System for Global Computing",SIGMOD Record, vol. 32, No. 3, Sep. 2003.*

(Continued)

*Primary Examiner* — Mohsen Almani
(74) *Attorney, Agent, or Firm* — Daly, Crowley, Mofford & Durkee, LLP

(57) ABSTRACT

A computer implemented method, system, and program product for migration of a user's assets across a cloud comprising Service Units, the method comprising grouping Service Unit devices into cells, wherein the service units comprise storage devices, wherein each cell comprises a group of the Service Unit device comprising a common geographic region, grouping the cells into areas, each cell of the cells grouped into an area comprising a common geographic region, determining the location of the user with respect to the cells, determining the area corresponding to the determined cells, determining which cell of the cells contains the Service Unit device that provides the user with the best services; and transferring the user's assets to the Service Unit within the determined cell.

19 Claims, 13 Drawing Sheets

(56) References Cited

OTHER PUBLICATIONS

Imielinski et al., "Data Management for Mobile Computing", SIGMOD Record, vol. 22, No. 1, Mar. 1993.*

Dunham et al., "A mobile transaction model that captures both the data and movement behavior", Mobile Networks and Applications 2 (1997) 149-162, Baltzer Science Publishers BV.*

Buyya, Rajkumar, et al. "Cloud computing and emerging IT platforms: Vision, hype, and reality for delivering computing as the 5th utility." Future Generation computer systems 25.6 (2009): 599-616.*

Bobroff, Norman, Andrzej Kochut, and Kirk Beaty. "Dynamic placement of virtual machines for managing sla violations." 2007 10th IFIP/IEEE International Symposium on Integrated Network Management. IEEE, 2007. (Year: 2007).*

Liu, Liang, et al. "GreenCloud: a new architecture for green data center." Proceedings of the 6th international conference industry session on Autonomic computing and communications industry session. ACM, 2009. (Year: 2009).*

Appleby, Karen, et al. "Oceano-SLA based management of a computing utility." 2001 IEEE/IFIP International Symposium on Integrated Network Management Proceedings. Integrated Network Management VII. Integrated Management Strategies for the New Millennium (Cat. No. 01EX470). IEEE, 2001. (Year: 2001).*

Gambi, Alessio, Mauro Pezze, and Michal Young. "SLA protection models for virtualized data centers." 2009 ICSE Workshop on Software Engineering for Adaptive and Self-Managing Systems. IEEE, 2009. (Year: 2009).*

Sahai, Akhil, et al. "Specifying and monitoring guarantees in commercial grids through SLA." CCGrid 2003. 3rd IEEE/ACM International Symposium on Cluster Computing and the Grid, 2003. Proceedings.. IEEE, 2003. (Year: 2003).*

* cited by examiner

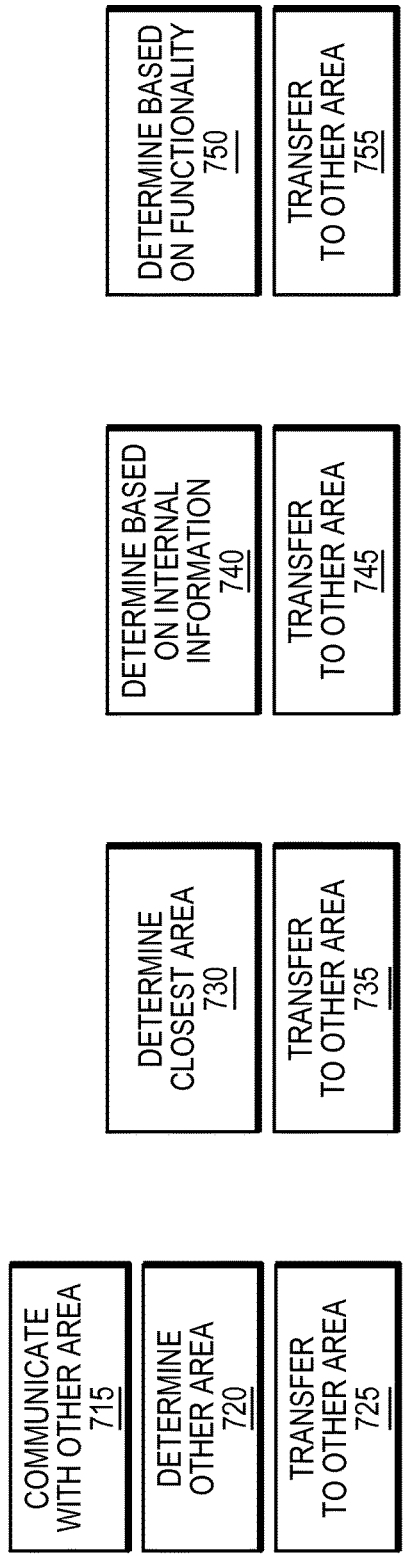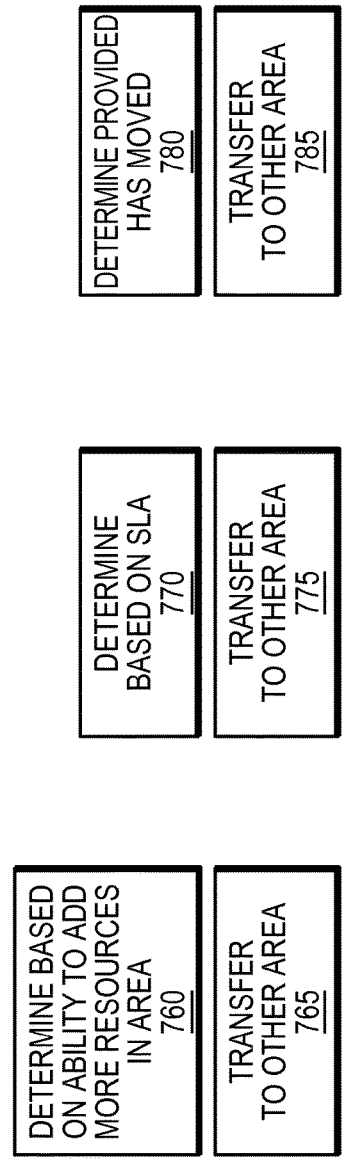

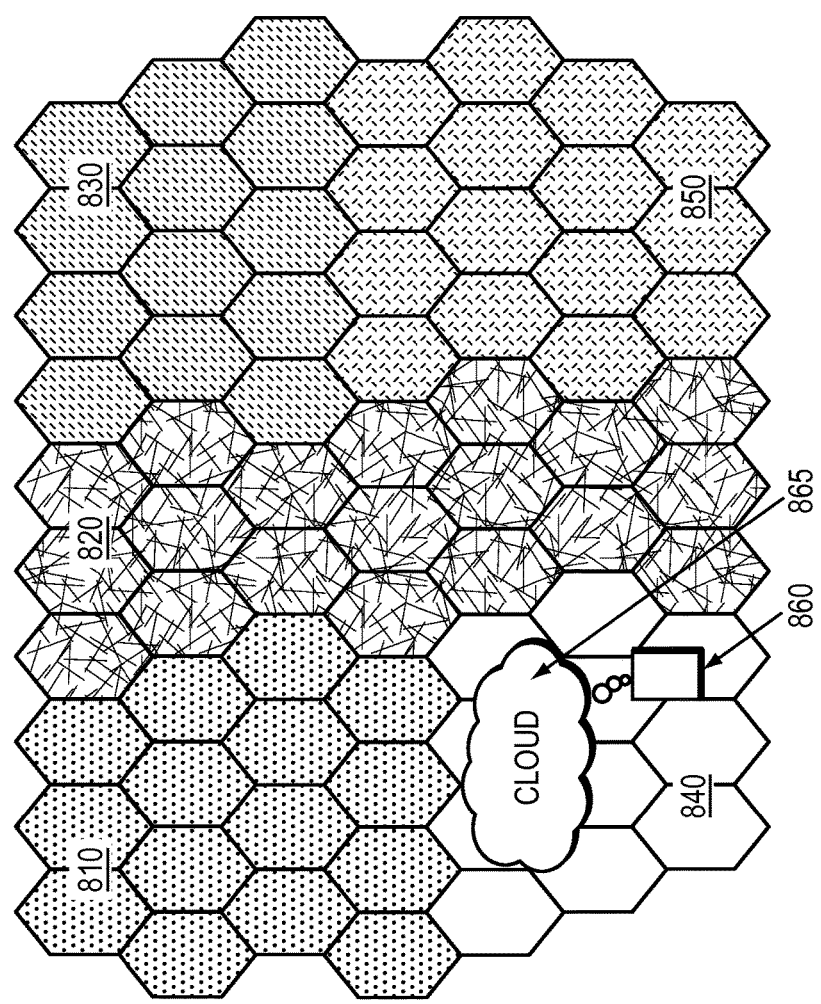

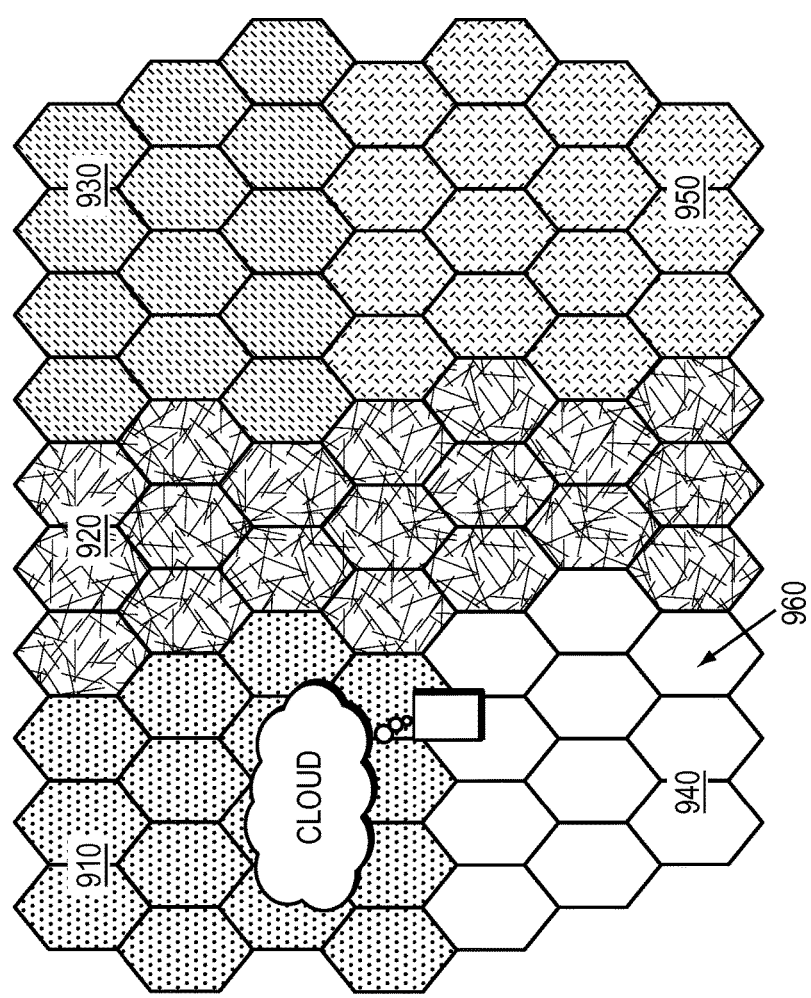

US 10,334,482 B1

SELF ADAPTIVE APPLICATION AND INFORMATION MOVEMENT IN A CLOUD ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to Self Adaptive Application and Information Movement in Cloud Environment.

BACKGROUND

A traditional array storage may be a collection of disks operating together logically as a unified storage device. Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

SUMMARY

A computer implemented method, system, and program product for migration of a user's assets across a cloud comprising Service Units, the method comprising grouping Service Unit devices into cells, wherein the service units may comprise storage devices, wherein each cell comprises a group of Service Unit devices comprising a common geographic region, grouping the cells into areas, each cell of the cells grouped into an area comprising a common geographic region, determining the location of the user with respect to the cells, determining the area corresponding to the determined cells, determining which cell of the cells contains the Service Unit device that provides the user with the best services; and transferring the user's assets to the Service Unit within the determined cell.

DESCRIPTION OF DRAWINGS

FIG. 7a shows an embodiment of the current techniques for communicating with cells;

FIG. 7b shows an embodiment of the current techniques to determine the closest cell;

FIG. 7c shows an embodiment of the current techniques for determination of a cell based on the cell's internal information;

FIG. 7d shows an embodiment of the current techniques where a determination is based on functionality of the cells;

FIG. 7e shows an embodiment of the current techniques where a determination is made based on the ability to add more resources to a cell;

FIG. 7f shows an embodiment of the current techniques where a determination is made based on a SLA;

FIG. 7g shows an embodiment of the current techniques a determination is made when the makeup of a cell has changed;

FIG. 8 shows an embodiment of the current techniques a cloud has been transferred from one cell to another;

FIG. 9 shows an alternative embodiment of the current techniques a cloud has been transferred from one cell to another;

DETAILED DESCRIPTION

Figure 1:
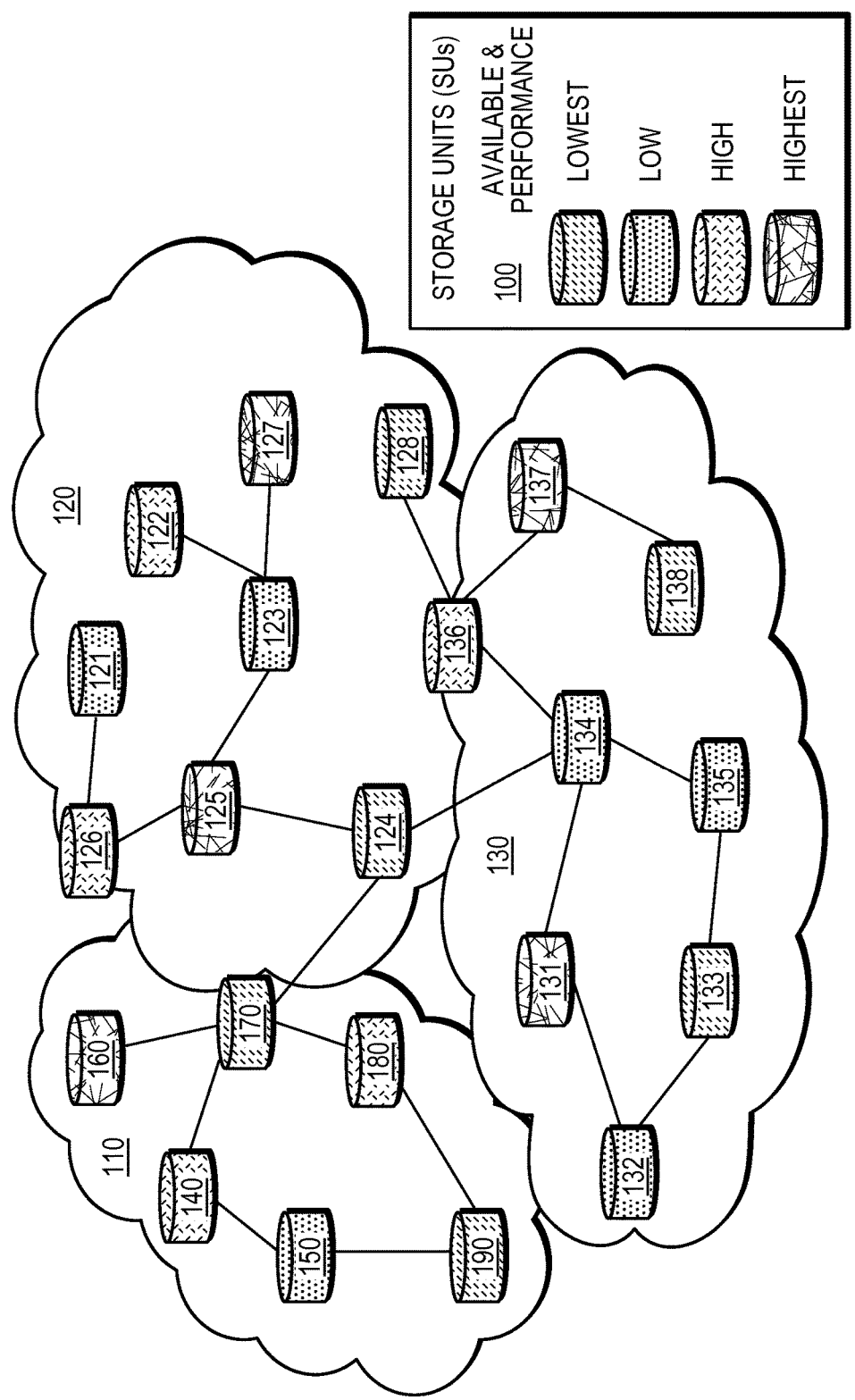
FIG. 1 shows an embodiment of a system on which the current techniques may be practiced.

Currently, the challenge of Data Migration is changing from moving data across a very structured storage tier environment to moving data across storage containers geographically dispersed and connected via networks such as wireless networks. In general, the storage industry may have a structured view of the storage tiers, where a collection of storage units may be grouped together and labeled as Tier 1, Tier 2, Tier 3, up to Tier n, depending on the their speed and access costs. Typically, the higher the speed and higher the cost storage corresponded to a lower number of tier, and the lower the speed and less expensive the storage corresponded to a higher number of the tier.

The adoption of the Virtual Desktop Infrastructure (VDI) and other mobile applications in a mobile world may present a new challenge to data migration. In addition to being at the correct tier to service access requests, the data may also have to change geographic location dynamically, in real time. For example, thin clients may have the need to stay "always connected" to their virtual desktops and applications. This may impose challenges as fragments or pieces of the information used, applications executed, or of the virtual desktop image may need to get downloaded to the end device in real-time, as the thin client moves.

As these thin clients move around physically (i.e. by walking, train, car, plane or other means of transport), the clients may increase the distance between themselves, the Virtual Desktop Manager (VDM) in the service provider, and the virtual desktop, information or applications the thin client may be accessing. Data may need to be migrated or replicated not only along the same tier but also to Storage Units at different geographical locations closer to the thin clients, even if the units belong to the same tier. That is, data migration may now include the need to move data closer to where the data may be needed, within the same tier or a different one. Applications may move dynamically; take for example those applications that run on mobile devices that need to access data. The applications running on the mobile devices may constantly move from one area to another, and the data they access or other applications they interact with may need to move as well, for efficiency, security or any other reason.

In an embodiment, the current techniques may use a Service Oriented Architecture (SOA) approach to data migration where the process of moving data across the several tiers and between geographic units within a tier may be performed in an automated and distributed manner.

The current techniques, in an embodiment may address Storage Tiers by breaking every tier into multiple Storage Units (SU), where an SU represents a storage container, which has associated with it a contract defining the services that it can provide. Examples of service contract characteristics may include physical location, access speed, capacity, read/write performance, ability to replicate the data, security services such as the ability to encrypt information and ensure its confidentiality, ability to comply and demonstrate compliance with regulations, standards, best practices and business objectives, ability to provide metrics indicating its performance (Key Performance Indicators), Recovery Point Objective (RPO) and Recovery Time Objective (RTO).

Similarly, the current techniques, in an embodiment may address processing capabilities by breaking it into multiple Processing Units (PU), where a PU represents a processing container, which has associated with it a contract defining the services that it can provide. Examples of service contract characteristics may include physical location, processing speed, read-write capabilities, ability to comply and demonstrate compliance with regulations, standards, best practices, and business objectives, and main memory allocated to applications.

In an embodiment, the term Service Unit (SvcU) may be used to describe, in a non specific manner, a Storage Unit, a Processing Unit, or any other unit of service for which the method and apparatus in an embodiment may be applicable to.

In an embodiment, Service Units may be provided by different Service Providers. A user may use Storage Services form a Service Provider SP1 and may move its data to a Storage Unit from a Service Provide SP2. The data movement may be driven by many reasons including geographical location, better services, and lower cost.

In an embodiment, Service Units may host or provide services for data, information, applications or any other unit for which services or hosting can be provided. In an embodiment the term Guest Item may be used to describe any entity that may be serviced by a Service Unit. A Guest Item may be, for example, data, information, application, a virtual application, a virtual appliance, voice message, a video, or music.

In an embodiment, a cloud may refer to the collection of any Service Units (e.g., devices or application themselves) where any Guest Item (e.g., information, processing or a particular task) may flow or migrate to. An internal cloud may refer to the collection of Service Units residing within the premises of an enterprise and an external cloud may refer to the collection of Service Units residing within the confines of a Service Provider, outside the enterprise. In an embodiment, the generic term cloud may refer to the union of an internal cloud and external cloud.

In an embodiment of the current techniques, a Registration Service may manage the export and import of service contracts by the Storage Units (SU), Processing Units (PU) or any other Service Units (SvcU). Transformation Services may automatically translate from one data schema to another, when necessary. In addition, an embodiment may include a Classification Service which automatically creates a Service Contract for each service provider/consumer, automatically creates a baseline for policies, automatically creates policy Driven Migration Service, and automatically moves Guest Item among service providers based on service contracts exported by providers, automatically creates policies associated with contents, and automatically creates baseline created by Classification Service. Transformation Services may calculate whether a Policy delivered by a Service Provider SP1 may be a super set of the Policy delivered by another Service Provider SP2 and may automatically migrate the movement of a Guest Item from SP2 to SP1. Transformation Services may decide to move a Guest Item between service providers when the policies may not be equal but equivalent or a subset of another.

In order to facilitate the movement of Guest Items, in an embodiment the current techniques may extend a SOA Enterprise Service Bus (ESB) to incorporate some of the properties such as those inherent in a wireless environment. For example, a geographical space may be divided into areas and these areas may be divided into cells. As devices migrate from one area to another, there may be a hand off protocol and service providers may be updated with information regarding the location of the two entities communicating and may decide which cells and areas should service the communication. In an embodiment of an SOA, the binding between the two sides of the connections, the Service Provider and the Consumer, may be defined during look up and it may not change while the entities are interacting. The embodiment of an architecture of the current techniques may extend the bus to include the notion of areas and cells and to provide alternative look up services as the consumer or provider move from one area or cell to another.

An embodiment of the current techniques may automate the migration process, may continue process migration without service disruption, may use self-learning mechanism to best match SvcU containers to Guest Item within an Enterprise and across enterprises and clouds, and may benefits from all SOA principles (e.g., loosely coupling), and may create a foundation for adding "Intelligence" to the Information Infrastructure.

Referring now to the embodiment of FIG. 1, the data needed for applications and thin clients may be contained within a storage cloud, which may be connected via a network made up of network devices. The network devices may be wireless or wired, they may use a variety of communication protocols, and they may be long distance or short distance. The embodiment of FIG. 1 illustrates a number of geographically spread out storage devices (Service Units), such as ATMOS devices, belonging to three different storage cloud providers.

For example, take the 3 clouds 110, 120, and 130. Each storage device in these clouds may be geographically distinct as well as the geographical area covered by each one of these clouds may also be geographically distinct. As well, each cloud, such as cloud 110, may consist of storage devices of common geographic location or uncommon geographic location, such as devices 140, 150, 160, 170, 180, and 190.

Each device may have different storage capabilities and may belong to any level of the tier; for example devices 170 and 190 have the lowest availability and the worst performance of the devices. Conversely, device 160 may have the highest availability and best performance of the devices. Device 150 may provide a low performance and low availability, but still superior to 170 and 190, while devices 140 and 180 may provide high availability and performance, but still inferior to 160. As well, each device may have a cost associated with it. The cost may be a pay per use cost or a fixed monthly cost with unlimited use, or any form of costs. Each device may have different capabilities of being compliant or demonstrating compliance to regulations, standards, best practices or business service level agreements (SLA).

Figure 2:
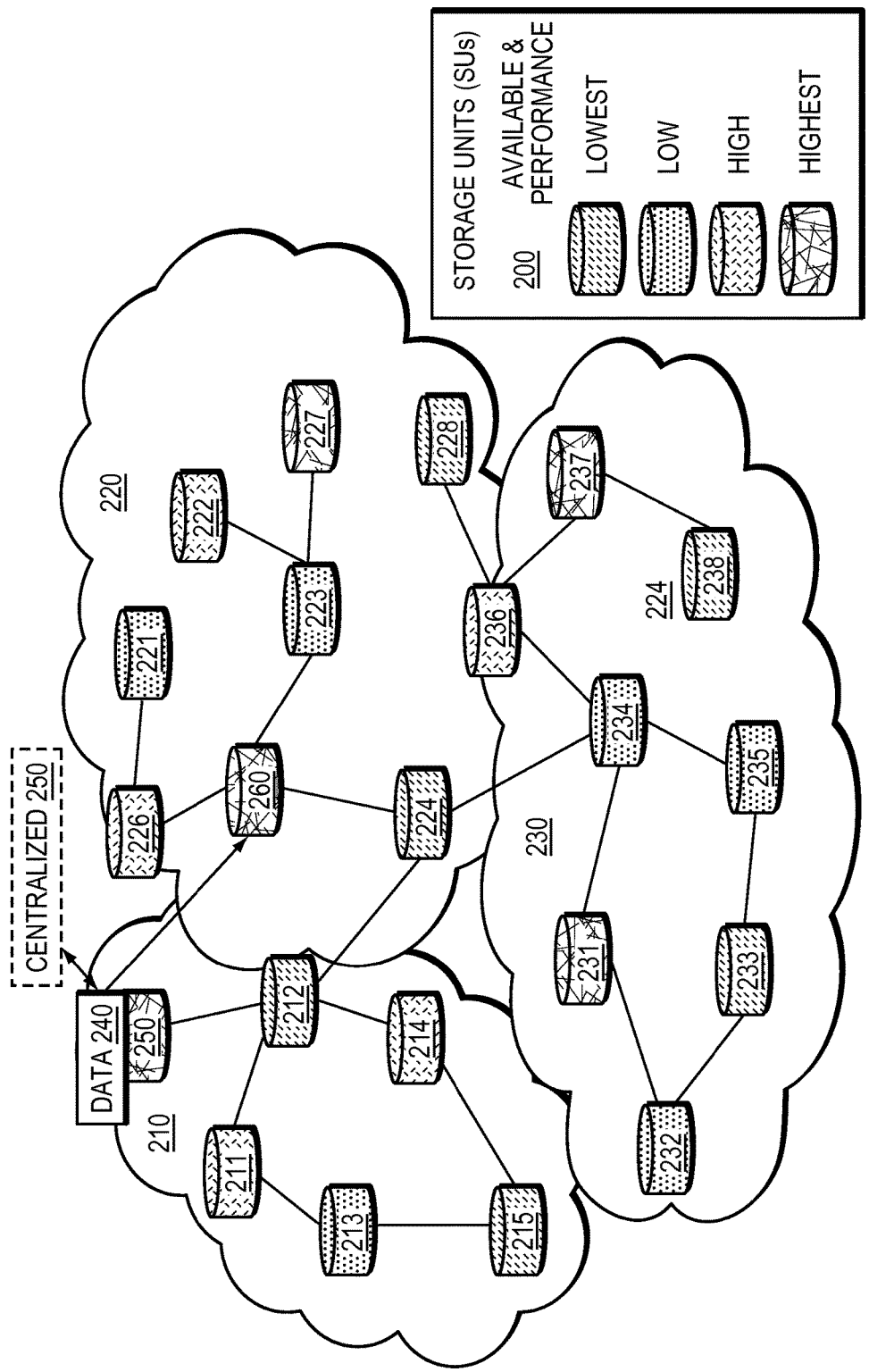
FIG. 2 shows an embodiment of a system with central management.

Referring to the embodiment of FIG. 2, typical transfer of information or data 240 between networked cloud nodes, such as cloud nodes 210 and 220, or from storage element 250 to another storage element 260 has been managed from a central location 250. This central location 250 may instruct the storage units, such as storage unit 250, how to transfer information or data 240 to follow an application running on a moving thin client. However, such centralized management may limit the speed of changes, have a single point of failure, require large amounts of processing power to process all the to change requests, and possible bottleneck transfers based on processing of other transfers. This type of centralized management may be complicated as more and more components may be added to the clouds and more and more clouds are forming every day.

Figure 3B:
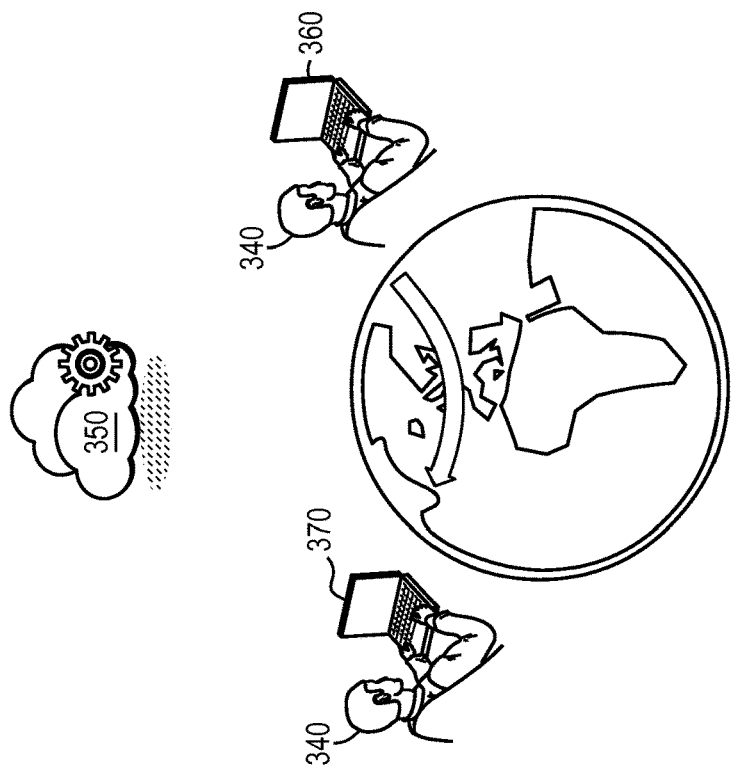
FIG. 3b shows an embodiment of a network cloud and geographic location of a user.
Figure 3A:
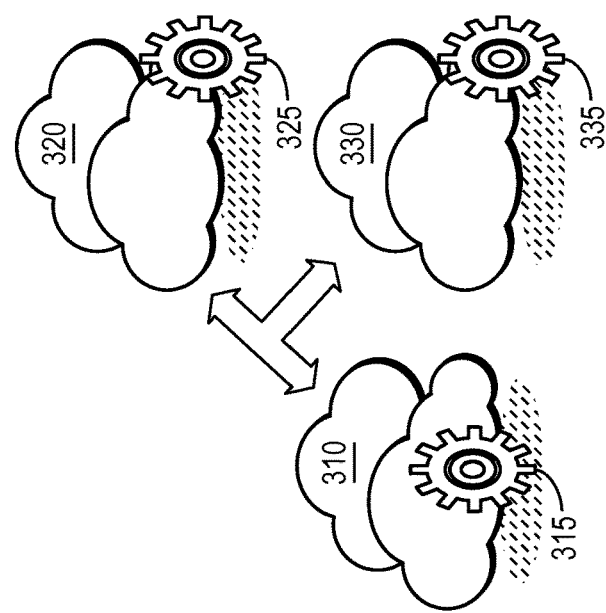
FIG. 3a shows an embodiment of network clouds and application program interfaces for the network clouds.

Referring to the embodiment of FIG. 3a, typically each cloud, such as clouds 310, 320, and 330, may have its own API, such as APIs 315, 325, and 335, which may make movement of data and applications in the clouds difficult. Referring to the embodiment of FIG. 3b, when a user, such as user 340, moved from one location 360 to another location 370, that user's guest item hosted in cloud 350 may previously not been able to follow that user and move to another cloud that may perhaps offer better services to the user based on its new location. The term "better services," in this scenario, may refer to lower costs, faster access, higher computing power, better support to compliance or any performance or business criteria favorable to the user that could be captured given its new location.

In an embodiment, once a user moves to a new location 370, it may even be the case that it may be more favorable for the data to move to a cloud or a storage unit in the cloud that may be further away from the physical location where the user moved to. The movement of the data may not be solely target shorter physical distances between the user's location and the data location, but it may be based on any criteria applicable in that particular context. For example, an American citizen traveling in Europe and the Middle East may prefer to have his data located in a cloud in France when he is in France and his data in the United States when he is in the Middle East, due to regulatory constraints.

However, it may be beneficial to move data and applications across Service Units located in the same or different clouds to follow a user so that the user's data and application may be moved as the user moves, in order to offer "better services" to the user. As data and application follows or moves with the user, it may be necessary to move the data and application from Service Units within the same cloud or across different clouds. Conversely, it may be possible to move data or applications to a higher or lower level tier within the same cloud or a different one.

In an embodiment of the current techniques, data or applications that a user may be accessing may be moved from Service Unit to Service Unit, to follow the user where the movement targets to improve the delivery of services to the user according to the policy the user defined. The movement may also provide better results to the service provider, such as higher profit margins or greater market share. In an embodiment, the cloud, network, server or storage device may have knowledge of its geographic location proximity to the user. As the distance between the user and the Service Unit grows or the complexity of the communication between the user and the Service Unit increases, the Service Unit may begin to communicate with other Service Units that may be closer to the user.

In an embodiment, the communication may determine whether one of the other Service Units can best deliver the services required by the user. One of the criteria may be that another Service Unit may be geometrically closer to the user and better suited to store the user's data or host the user's application. The Service Unit may then transfer the user's data or application to the Service Unit closest to the user, provided that new Service Unit may deliver its services satisfying the policies specified by the user. In other words, the new service may be within a set of performance or service contract parameters (i.e. satisfies a Service Level Agreement (SLA)).

Figure 4:
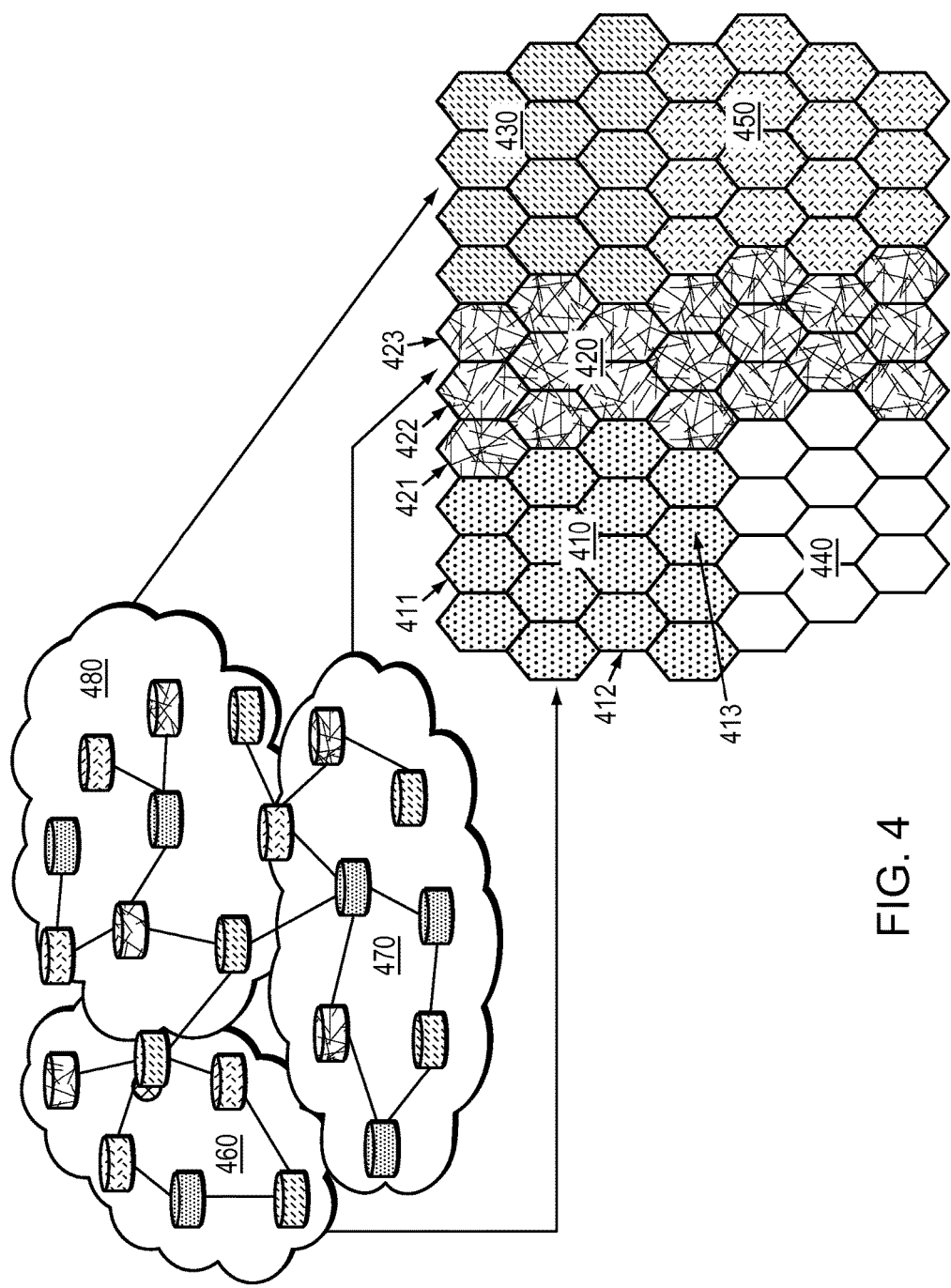
FIG. 4 shows an embodiment of the current techniques mapping networks to cells.

Referring to the embodiment of FIG. 4, clouds 460, 470, and 480 may be assigned to correspond to a set of areas such as area 410, 420 and 430. Each area, 410-450 may have a geographic location and may know the location of its closest areas. Further, each area may correspond to a collection of networked Service Units of similar geographic location or of a certain geographical proximity. In FIG. 4, the networks, 460, 470 and 480 may be mapped to a set of areas such as areas 410, 420, and 430.

In an embodiment, an area, such as area 420, may be divided into cells, such as cells 421, 422, and 423. Cells and areas may be managed by protocols that monitor certain parameters for the Service Units residing in a particular cell or area respectively. Protocol managers may deploy specific functions for the movement of data or processing across different cells within the same area and between cells belonging to different areas.

Figure 5:
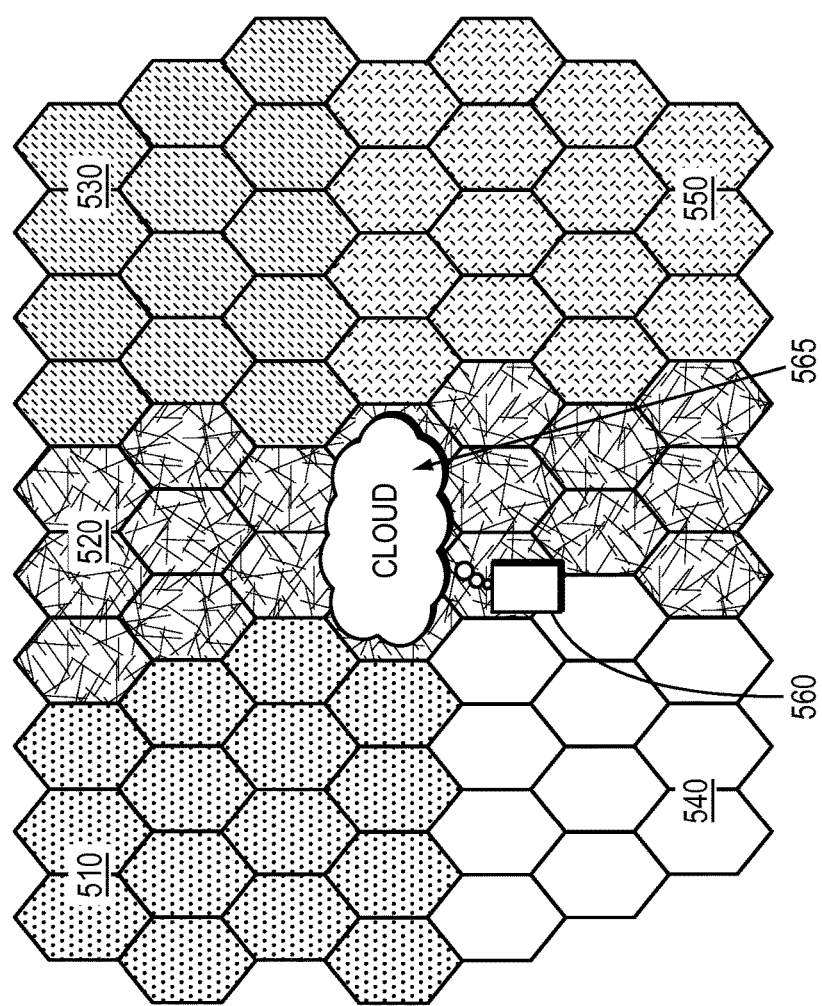
FIG. 5 shows an embodiment the current techniques with respect to a system with a user and cloud.
Figure 6:
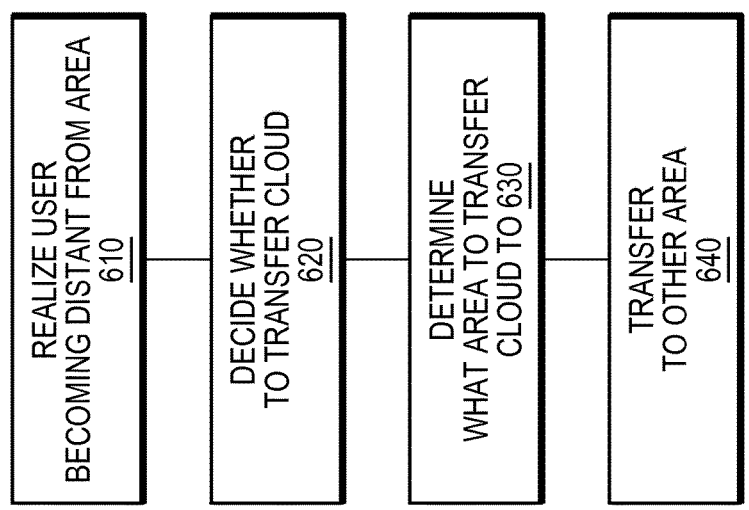
FIG. 6 shows an embodiment of a method of the current techniques.

Referring to FIG. 5 and FIG. 6, when a user, such as user 560 moves away from an area such as area 520, it may be realized, for example in an embodiment by the area or by an entity manager, 610 that the user 560 may leave or may be about to leave the area 520. A decision may be made decision 620 whether or not the data 565 should be transferred to follow the user 560. As well, it may be determined 630 which area to transfer 640 the user's data 565 and may transfer the data 565.

Refer now to the embodiments of FIGS. 5, 7*a-c*, and 8. The decision to transfer may be performed in several ways. In some embodiments, communication may occur with some of or all the neighbor areas, such as areas 510, 540, 530, and 550 to determine 720 which area would be best to transfer 725 the user's data or application 865. This transfer 725 of the user's guest item 865 to area 840 may be made by a determination 730 of the closest area to the user 860. As well, there may be internally stored information to make the determination 740 which area would be best for the user's information or application 565 and may make the transfer 745 with or without communicating with the other areas.

In some embodiments, the area 520 currently hosting the user's guest item 565 may have no knowledge of the exact location of the user 560, however it may be determined that the geographic distance between the user 560 and the area 520 has increased or that any other parameter may have changed and an evaluation of a potential transfer may be required. Communication 715 may occur with each of the area's neighboring areas, such as areas 510, 520, 530, 540, and 550, to determine 730 which neighbor, neighbor 840, is geographically closest to the user 560. The guest item 865 may be transferred 735 to area 840 and the closest area to the user 860.

Referring to an alternative embodiment of FIGS. 5, 7*d*, and 9, the functionality of its neighboring cells 510, 520, 530, 540, and 550, may be used to determine 750 to which area the cloud should be transferred 755. For example, functionality may be considered in the determination 750 and the determination of where to transfer the cloud may not be based on the closest area 940 may not have enough capabilities to process the user 960 and the cloud 965 may be transferred 755 to the next closest area 910.

In an embodiment, geographical distance is one of the parameters that may be used for migration. The cloud provider may not be co-located in a geographic area with the user for many reasons. There may not be a cloud provider geographically close to the user or the closest geographic area may not support sufficient encryption or access speed or low cost. The most cost effective manner to deliver the services required by the User may be by a cloud provider that may be the furthest from a geographical location perspective. The Protocol Manager for the cell or area in which the user may be located may communicate with other Protocol Managers to decide the Service Units that may best serve the User, to migrate Guest Items across these Service Units, and to finalize the hand-off.

Conversely, in some embodiments, the geographic area may be able to sufficiently provide all of the user requirements but a single constraint, such as an SLA or an export control provision may specify that the Guest Item may not be transferred or reside in this particular geographical area. Such a rule may result from export control or because of sensitivity of classified documents.

Figure 10:
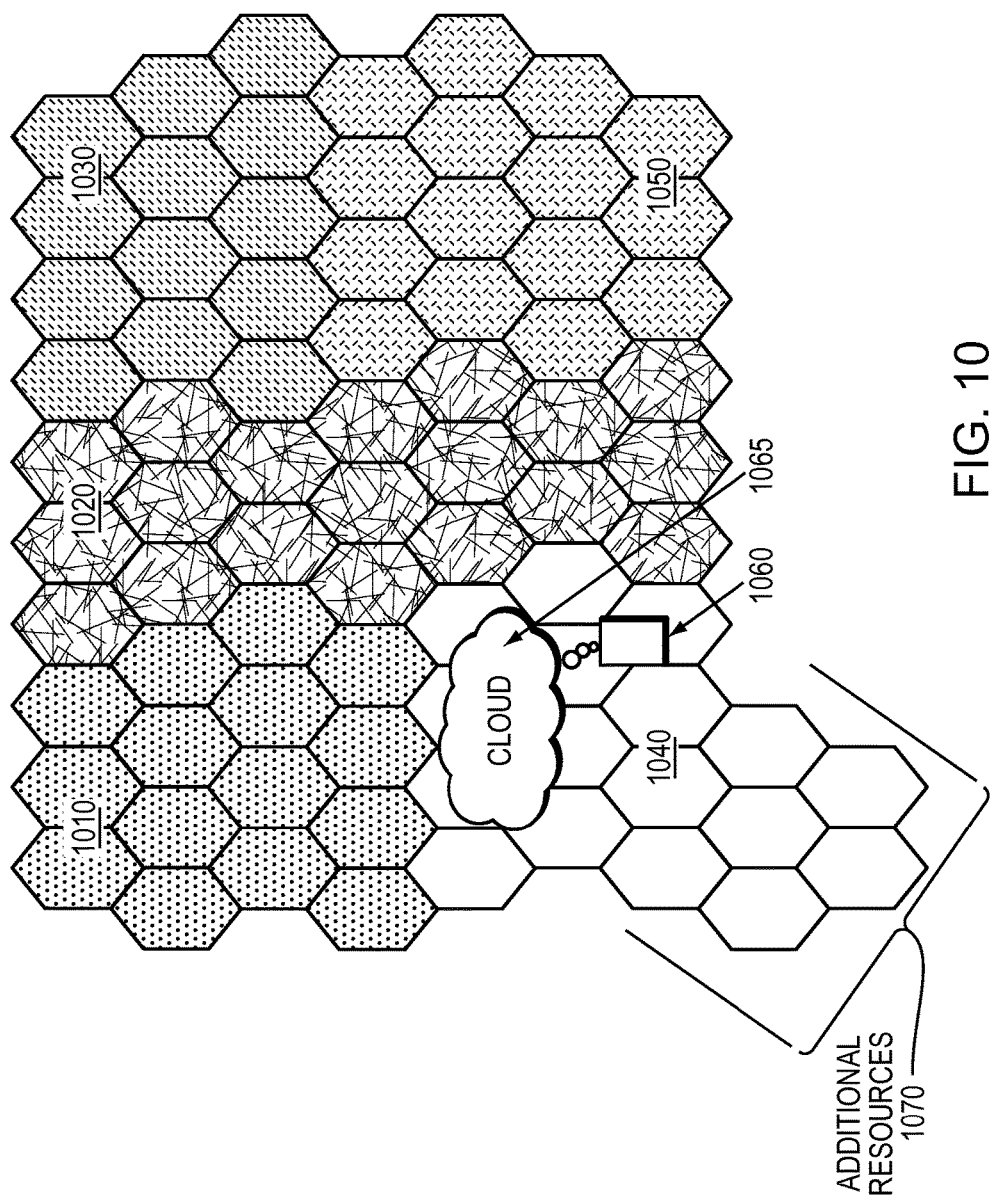
FIG. 10 shows an alternative embodiment of the current techniques a cloud has been transferred from one cell to another.

Referring to the alternative embodiments of FIG. 7*e* and FIG. 10, additional capabilities or resources may be obtained for an area, such as area 1040, and cost to obtain the resources 1070 may be a factor in determining 760 to which area the user's Guest Item (e.g., information or application) 1065 may be transferred 765 and the information or application 1065 may be transferred 765 to the closest area and more resources 1070 may be obtained.

As well referring to the embodiments of FIGS. 5 and 7*f*, other embodiments may use a Service Level Agreements (SLA) in determining 770 to which area the guest item should be transferred 775. Further, any combination of these inputs as well as many others contemplated may be used to make the decisions to which cell the cloud 565 should be transferred.

In an alternative embodiment of the current techniques referring to FIGS. 5, 7*a*, and 8, for example through the use of multiple devices, there may be a good estimate of the geographic location of the user 560. This information may be used to only contact the area's 520 neighbors, such as areas 810 and 840, which may be geometrically proximate to the user 560. The transfer 725 of the user's guest item 865 from area 820 to area 840 may eliminate the need for a central system to manage where the data may be stored. As well, transfer may be fluid, seamless, and transparent to the user.

Referring to the embodiments of FIGS. 5 and 7*f* take, for example, an alternative embodiment where a service level agreement (SLA) may be used as the metric to determine 770 to which area the user's cloud should be transferred 775. SLAs may account for cost, storage capability, speed, functionality, performance, as well as any number of characteristics. It may be determined that a guest item, such as 565, should be transferred. Communication with the area's neighbors may occur or the to determined the SLA characteristics or the SLA characteristics the neighbors may be stored. A determination 770 may be made which area most closely matches the requirements for the cloud 565. Further, the guest item 565 may provide certain requirements which may dictate to which cloud it may be transferred. The guest item 565 characteristics may be variable or may be pre-established.

Figure 11:
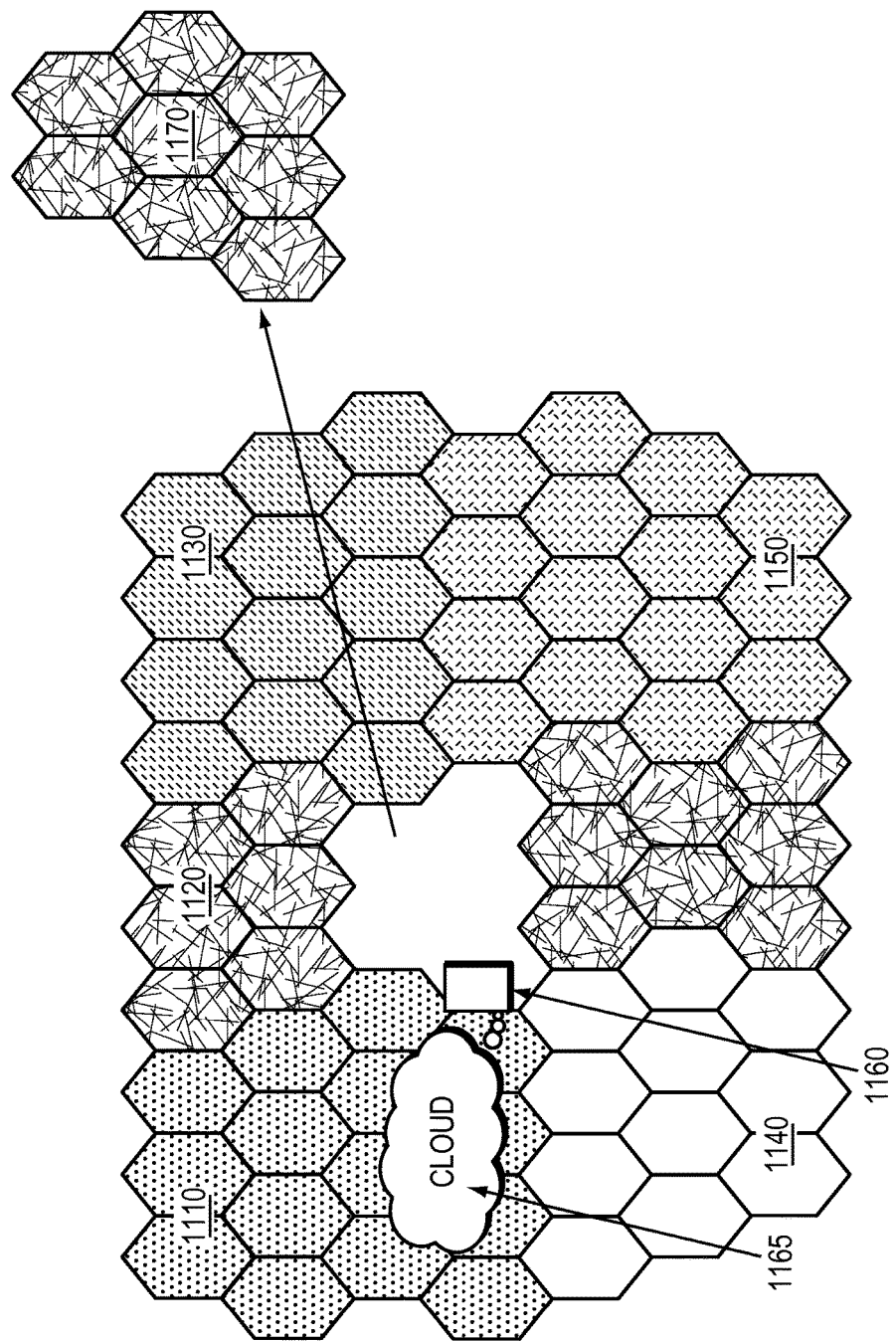
FIG. 11 shows an alternative embodiment of the current techniques a cloud has been transferred from one cell to another.

Referring to the embodiment of FIGS. 7*g* and 11, the providers or portions of the hardware 1170 that make up the area 1120 may also be moving, the configuration of the providers may be changing, or changes in the environment may impact the providers. This may present a scenario where the configuration of an area may change, which may necessitate a transfer 785 of the user's guest item 1165. In an embodiment, it may be determined 780 that the provider has moved and the guest item 1165 may need to be transferred 785. The policy driven migration service may decide to move the guest item from one location 1120 to another location 1110, shifting the guest item 1165 from one area 1120 to another area 1110. In this case, the hand off protocol may evaluate all the bindings the Storage Unit may be servicing and then evaluate whether consumers should reconnect to other providers.

In an alternative embodiment, the time of day may dictate the cost using a particular resource. When the cost shifts due to the time of day, this may trigger a recalculation of which cell may provide the best services for the guest item. As well, in other embodiments, other environmental factors such as the temperature, number of users, availability of devices, increase of traffic on the provider, may also trigger a recalculation of which provider may provide the best services.

Figure 12:
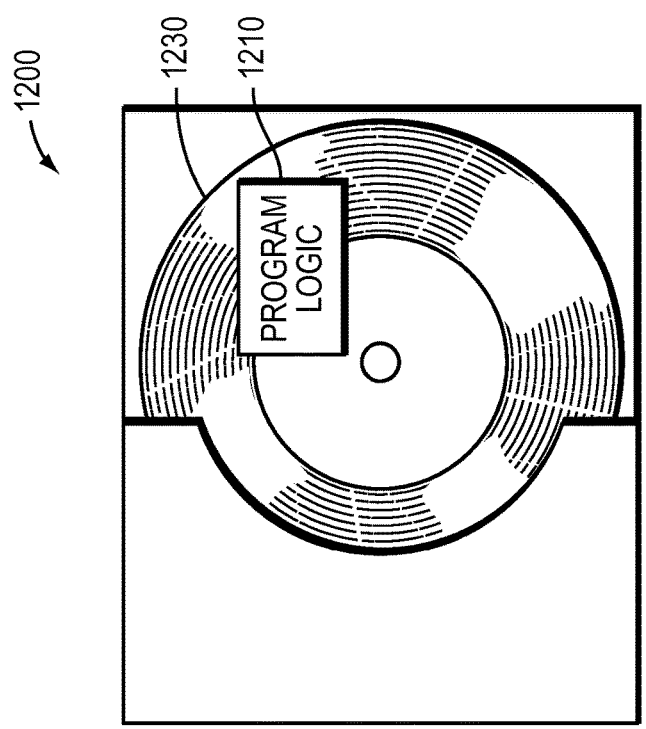
FIG. 12 depicts program logic embodied on a computer-readable medium in accordance with an embodiment.
Figure 13:
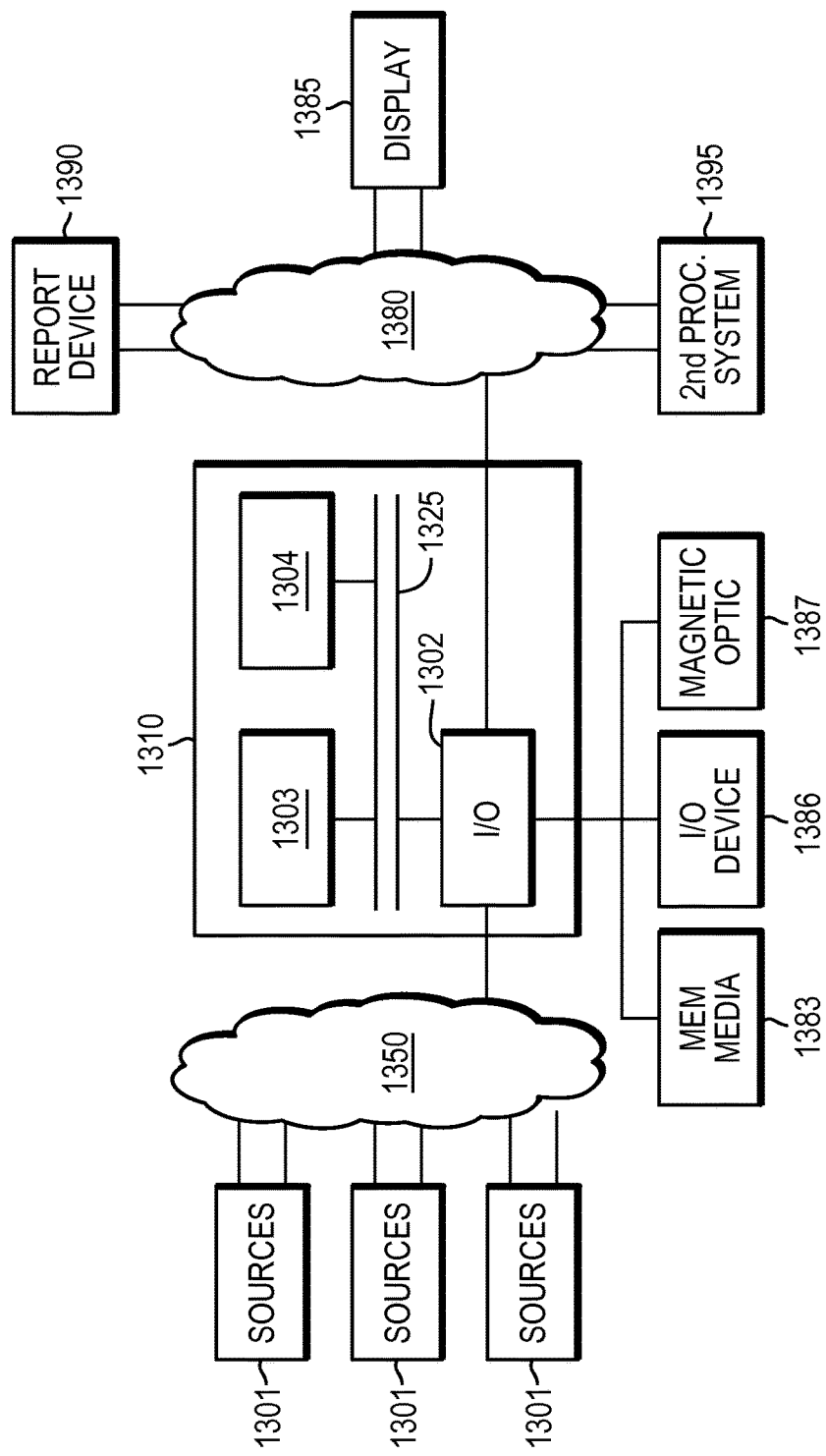
FIG. 13 depicts a computer system for performing the current techniques in accordance with an embodiment.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 12 shows Program Logic 1234 embodied on a computer-readable medium 1230 as shown, and wherein the Logic is encoded in computer-executable code configured for carrying out the reservation service process of this invention and thereby forming a Computer Program Product 1200.

The logic for carrying out the method may be embodied as part of the system described below, which is useful for carrying out a method described with reference to embodiments shown in, for example, FIG. 5 and FIG. 6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given, herein, but may be modified within the scope and equivalents of the appended claims.

What is claimed is:

1. A computer implemented method for data migration across a cloud, the method comprising:
    dividing a set of storage tiers into a set of storage units; wherein each storage unit of the set of storage units is a storage container; where each storage unit of the set of storage units has a service contract defining services provided by the storage unit;
    defining the cloud to include the set of storage units and a set of processing units; wherein each processing unit of the set of processing units is a processing container; wherein each processing container has a service contract defining the services the processing container provides;
    dividing the set of storage units and processing units of the cloud into a set of cells; wherein a first cell of the set of cells provides services to a user; wherein assets of the user are stored within the first cell;
    determining, based in part on one or more service contracts of the first cell, that the first cell does not provide the user with one or more services that conform to a service level agreement (SLA); wherein the SLA includes a set of characteristics for a set of services for the user, wherein at least a portion of the storage units in the set of storage units are moving so that the SLA will no longer be met;
    communicating from the first cell to other cells of the set of cells to determine a second cell of the set of cells that is able to provide the user with one or more services that conform to the service level agreement;
    transferring the assets of the user from the first cell to the second cell by migrating the assets of the user from the first cell to the second cell.

2. The computer implemented method of claim 1 wherein the assets of the user include user data; wherein the transferring the assets of the user transfers the data from the first cell to the second cell; wherein the services of the first cell do not confirm to the access speed performance characteristics of the SLA.

3. The computer implemented method of claim 1 wherein the services of the first cell do not confirm to the processing speed performance characteristics of the SLA.

4. The computer implemented method of claim 2 wherein the determining that the first cell is no longer able to provide the user with one or more services is further based on movement of the user.

5. The computer implemented method of claim 4 further comprising:
    estimating a location of the user using multiple cells.

6. The computer implemented method of claim 1 wherein the SLA includes a set of time base cost characteristics, the service contract of the first cell dictates that cost of the services vary by time; and based on the current time the time based cost characteristics do not match the SLA.

7. The method according to claim 1, wherein the second cell is geographically further from the user than the first cell.

8. The method according to claim 1, further including transferring the assets of the user from the set of storage units to a further set of storage units having a further set of cells.

9. The method according to claim 8, further including transferring the assets of the user to the further set of storage units without communicating with the set of storage units.

10. The method according to claim 1, wherein transferring the assets to a given set of storage units is precluded due to an export control provision.

11. The method according to claim 1, wherein a configuration of at least a portion of the storage units in the set of storage units is changing so that the SLA will no longer be met.

12. A computer program product for data migration across a cloud, the computer program product comprising:
    a non-transitory computer-readable storage medium encoded with computer-executable program code enabling:
    dividing a set of storage tiers into a set of storage units; wherein each storage unit of the set of storage units is a storage container; where each storage unit of the set of storage units has a service contract defining services provided by the storage unit;
    defining the cloud to include the set of storage units and a set of processing units; wherein each processing unit of the set of processing units is a processing container; wherein each processing container has a service contract defining the services the processing container provides;
    dividing the set of storage units and processing units of the cloud into a set of cells; wherein a first cell of the set of cells provides services to a user; wherein assets of the user are stored within the first cell;
    determining, based in part on one or more service contracts of the first cell, that the first cell does not provide the user with one or more services that confirm to a service level agreement (SLA); wherein the SLA includes a set of characteristics for a set of services for the user, wherein at least a portion of the storage units in the set of storage units are moving so that the SLA will no longer be met;
    communicating from the first cell to other cells of the set of cells to determine a second cell of the set of cells that is able to provide the user with one or more services that confirm to the service level agreement;

transferring the assets of the user from the first cell to the second cell by migrating the assets of the user from the first cell to the second cell.

13. The computer program product of claim of claim 12 wherein the assets of the user include user data; wherein the transferring the assets of the user transfers the data from the first cell to the second cell; wherein the services of the first cell do not confirm to the access speed performance characteristics of the SLA.

14. The computer program product of claim 13 wherein the determining that the first cell is no longer able to provide the user with one or more services is further based on movement of the user.

15. The computer program product of claim 12 wherein the SLA includes a set of time base cost characteristics, the service contract of the first cell dictates that cost of the services vary by time; and based on the current time the time based cost characteristics do not match the SLA.

16. A system for data migration across a cloud, the system comprising:
    a set of storage tiers;
    a set of processing units;
    a processor;
    a volatile memory; and
    a non-volatile memory storing computer program code that when executed on the processor causes the processor to execute a process operable to perform the operations of:
    dividing the set of storage tiers into a set of storage units; wherein each storage unit of the set of storage units is a storage container; where each storage unit of the set of storage units has a service contract defining services provided by the storage unit;
    defining the cloud to include the set of storage units and the set of processing units; wherein each processing unit of the set of processing units is a processing container; wherein each processing container has a service contract defining the services the processing container provides;
    dividing the set of storage units and processing units of the cloud into a set of cells; wherein a first cell of the set of cells provides services to a user; wherein assets of the user are stored within the first cell;
    determining, based in part on one or more service contracts of the first cell, that the first cell does not provide the user with one or more services that confirm to a service level agreement (SLA); wherein the SLA includes a set of characteristics for a set of services for the user, wherein at least a portion of the storage units in the set of storage units are moving so that the SLA will no longer be met;
    communicating from the first cell to other cells of the set of cells to determine a second cell of the set of cells that is able to provide the user with one or more services that confirm to the service level agreement;
    transferring the assets of the user from the first cell to the second cell by migrating the assets of the user from the first cell to the second cell.

17. The system of claim of claim 16 wherein the assets of the user include user data; wherein the transferring the assets of the user transfers the data from the first cell to the second cell; wherein the services of the first cell do not confirm to the access speed performance characteristics of the SLA.

18. The system of claim 17 wherein the determining that the first cell is no longer able to provide the user with one or more services is further based on movement of the user.

19. The system of claim 16 wherein the SLA includes a set of time base cost characteristics, the service contract of the first cell dictates that cost of the services vary by time; and based on the current time the time based cost characteristics do not match the SLA.

* * * * *